Sept. 3, 1935.  F. B. STEARNS  2,013,366
INTERNAL COMBUSTION ENGINE
Filed July 9, 1928   8 Sheets-Sheet 1

Inventor
Frank Ballou Stearns,
By Frank M. Slough
His Attorney

Sept. 3, 1935.  F. B. STEARNS  2,013,366
INTERNAL COMBUSTION ENGINE
Filed July 9, 1928  8 Sheets-Sheet 4

Inventor
Frank Ballou Stearns
by Frank M. Slough
his attorney

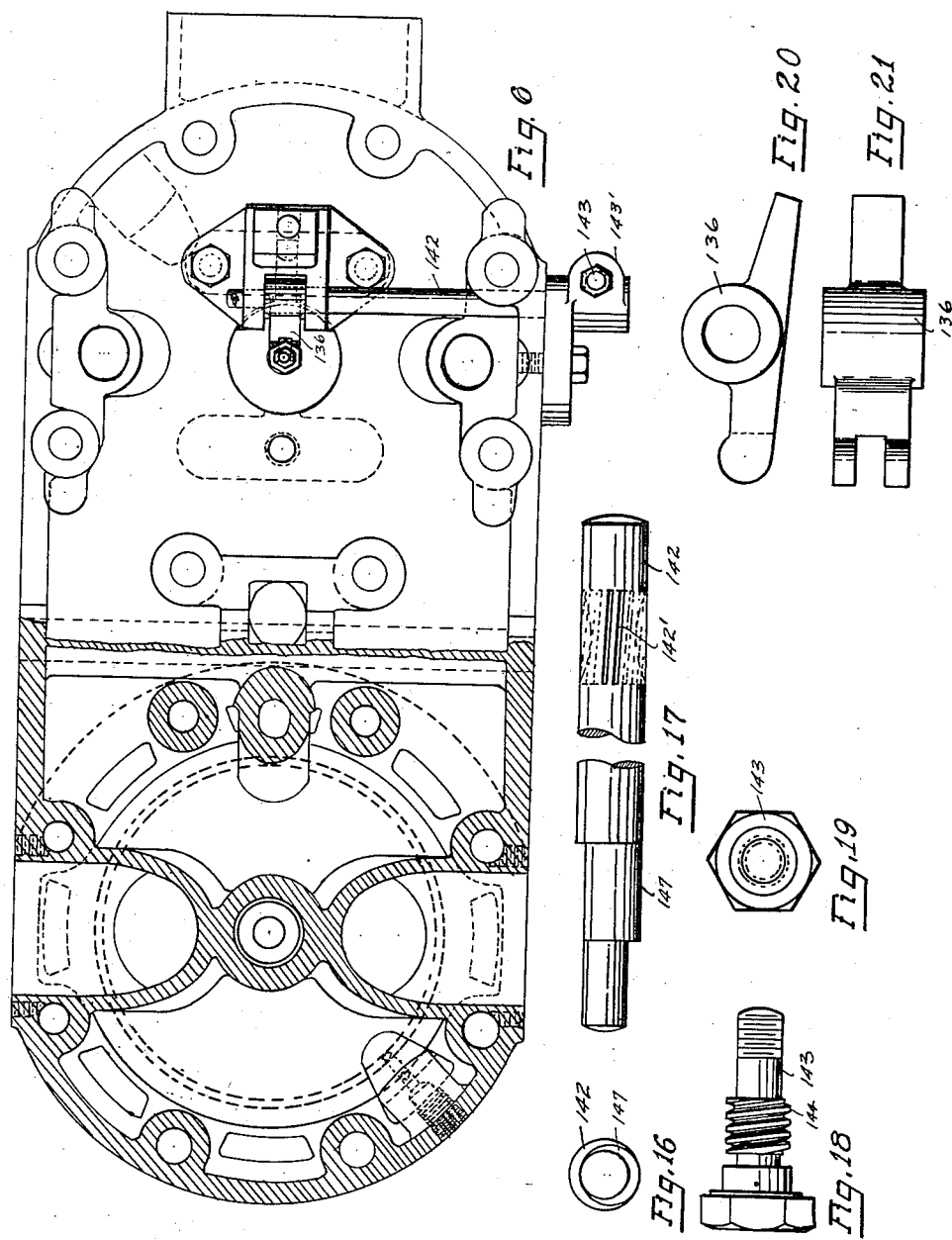

Sept. 3, 1935.  F. B. STEARNS  2,013,366
INTERNAL COMBUSTION ENGINE
Filed July 9, 1928    8 Sheets-Sheet 6
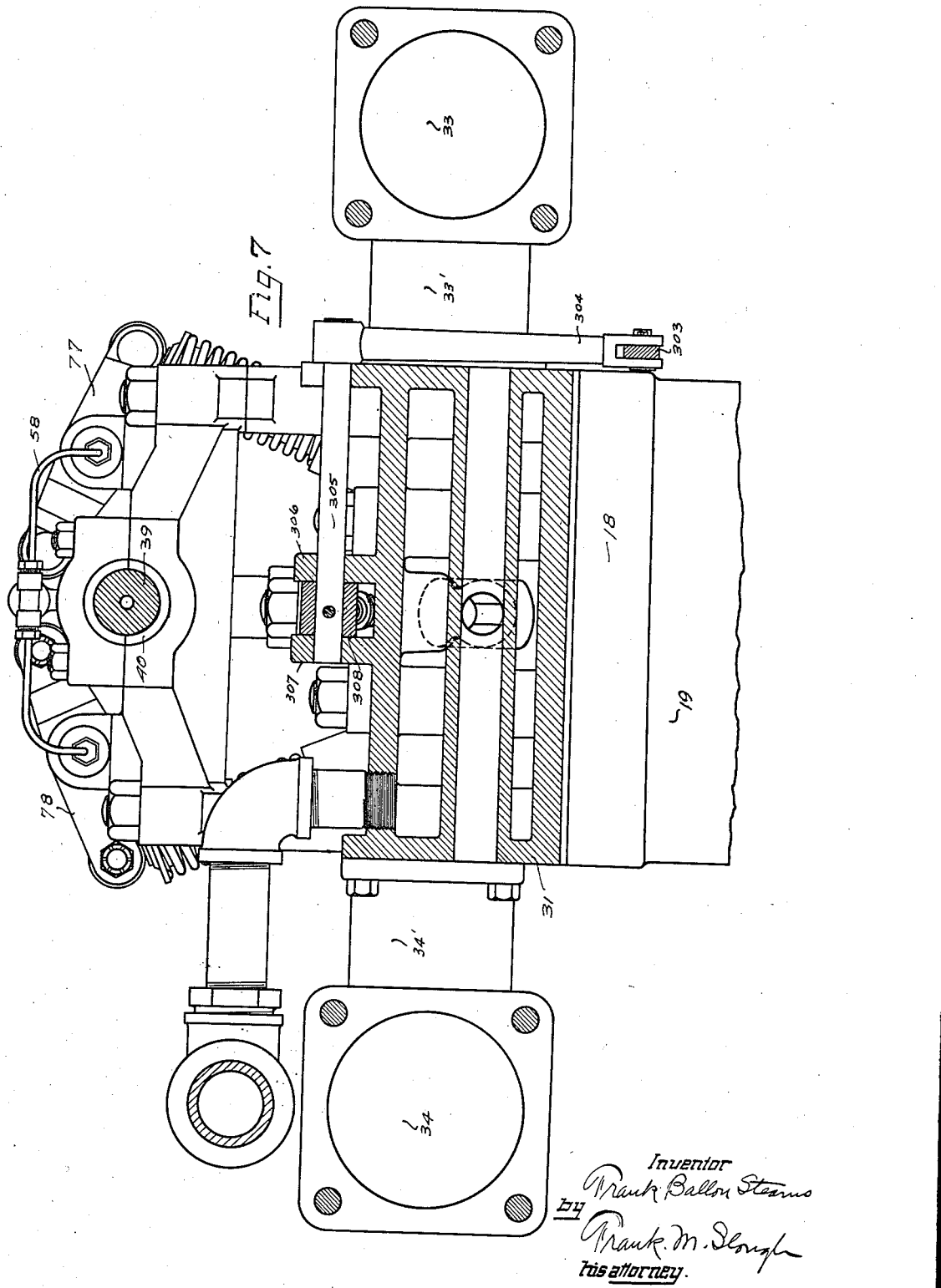
Inventor
Frank Ballou Stearns
by Frank M. Slough
his attorney.

Sept. 3, 1935. F. B. STEARNS 2,013,366
INTERNAL COMBUSTION ENGINE
Filed July 9, 1928 8 Sheets-Sheet 7
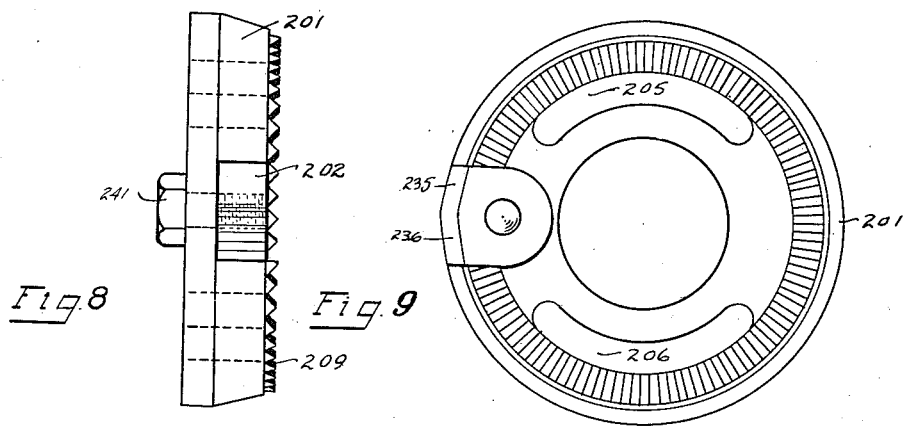
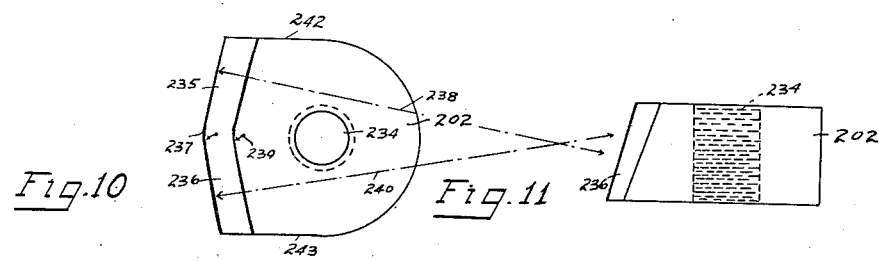
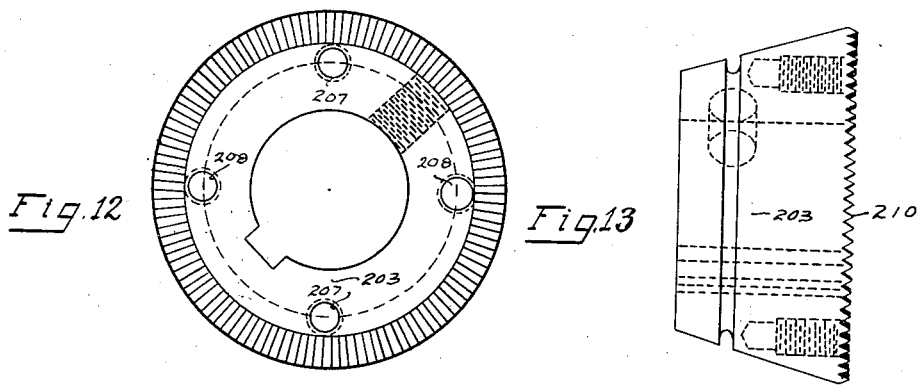
Frank Ballou Stearns, Inventor
By Frank M. Slough
His Attorney Sept. 3, 1935.  F. B. STEARNS  2,013,366
INTERNAL COMBUSTION ENGINE
Filed July 9, 1928   8 Sheets-Sheet 8
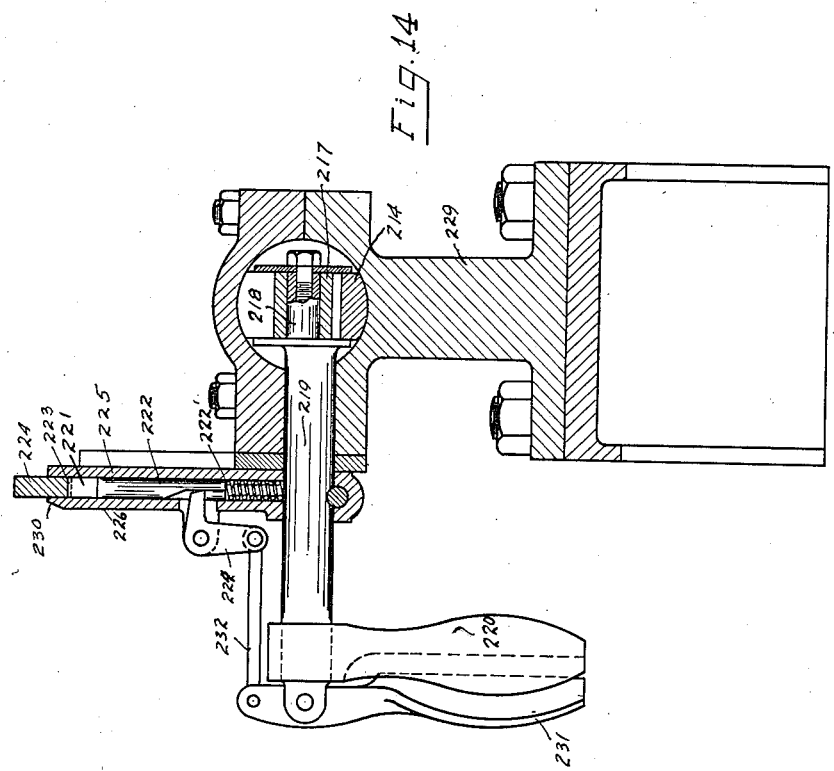
INVENTOR
Frank Ballou Stearns.
BY Frank M. Slough
ATTORNEY.

Patented Sept. 3, 1935

2,013,366

UNITED STATES PATENT OFFICE 2,013,366

INTERNAL COMBUSTION ENGINE

Frank Ballou Stearns, Shaker Heights, Ohio

Application July 9, 1928, Serial No. 291,217

7 Claims. (Cl. 123—65)

My invention relates to internal combustion engines and relates particularly to internal combustion engines of the fuel injection type.

In two-cycle internal combustion engines of the fuel injection type, which comprises Diesel engines and the like, great difficulty has heretofore been had in providing the engine cylinders with the proper amount of air to effect efficient scavenging of the engine cylinder and to effect charging the engine cylinder with new air, free from mixture with an undue proportional amount of exhaust gases, in an economical manner.

Difficulty has always been had to effect a good combustion of the admitted fuel and compressed air at widely varying speeds of engine operation. In such engines of the prior art with which I am familiar, in order to operate the same to advantage, the air provided for the combustion must first be highly compressed, so as to be capable of being forced under pressure into the engine cylinder against the pressure of gases contained therein during the scavenging and air charging periods in the operation of the engine.

In such engines, therefore, a considerable amount of power relative to the total amount of power produced by the engine, must be expended in compressing the air introduced to the cylinders during operation of the engine, and a very considerable part of this air, due to the necessity of maintaining a high pressure in the cylinder during the scavenging period, passes out of the exhaust ports along with the exhaust gases. Various and many proposals have been made in an attempt to discover a reliable method of effecting scavenging and recharging with air of the engine cylinders, but all such attempts have fell short of complete success in operation, so far as I am aware, particularly when efforts have been made to effect operation of the engine at widely varying speeds.

An object, therefore, of my invention is to provide a method, supplemented by proper engine construction, effective to accomplish the desired results of efficient scavenging and efficient charging without the expenditure of an undue amount of air and without the necessity of so precompressing the scavenging and charging air prior to or during its admission to the engine cylinders, to effect a relatively high pressure thereof.

In general, as will be more specifically explained, I have found by proper arranging of parts of the apparatus, then properly admitting at proper times the air during the engine cycle of operation and effecting the discharge of the exhaust gases in a proper way in connection therewith, that I am able to take advantage of the inertia of the discharge burned gases in such a way as to assist very materially in the admission of clean air following the discharge of gases and without the necessity of accomplishing an undue amount of mixing of the clean air with the burned gases.

An object, therefore, of my present invention is to effect scavenging of exhaust gases and charging of an engine cylinder with air in a very highly efficient manner.

Another object of my invention is to effect admission of air in the engine cylinders partially by the effect of pressure of the air admitted, the admission being moreover assisted largely by the inertia effect of the exhaust burned gases simultaneously discharging from the cylinder.

Another object of my invention is to employ the momentum of gases discharging from an engine cylinder to effect an efficient recharging of the engine cylinder with clean air.

Another object of my invention is to provide an internal combustion engine of the two-cycle type wherein each engine cylinder is very efficiently charged, and relieved of burned gases continuously and in sequence.

Another object of my invention is to provide a multi-cylinder engine of the two-cycle type wherein the exhaust gases are discharged from the cylinders fired in such a way as to avoid back pressure tending to decrease the rate of discharge of the burned gases from the cylinders.

Another object of my invention is to provide in an internal combustion engine of the two-cycle type, means for continuously effecting flow of gases into and from the engine cylinder wherein the gases are expanded by burning fuel periodically injected therein, in such a way as to avoid the effects of counterpressure at the inlet and discharge ports for the cylinder at the time by admitting air and discharging burned gases to and from the cylinder, respectively.

Another object of my invention is to provide in a multi-cylinder internal combustion engine an improved controlling mechanism for the fuel injection valves.

Another object of my invention is to provide an improved adjusting mechanism for the valve controlling mechanism of an internal combustion engine.

Another object of my present invention is to provide an improved form of two-cycle internal combustion engine which will operate efficiently and workably over a wide range of operating speeds.

Another object of my invention is to provide an improved fuel injection valve for an internal combustion engine.

Another object of my invention is to provide an improved method of operating a two-cycle internal combustion engine.

Another object of my present invention is to provide an improved compression release mechanism for the cylinders of an internal combustion engine.

Another object of my invention is to provide for an internal combustion engine, a combustion chamber to which fuel and air is admitted for combustion purposes of such form and subjected to such operating conditions as to accomplish fuel combustion in a very efficient manner.

Other objects of my invention and the invention itself will become apparent from the following description of an embodiment of my invention and in which description reference will be had to the accompanying drawings illustrating the said embodiment.

Referring to the drawings:

Fig. 6 is a horizontal transverse view taken through the twin head of a pair of the engine cylinders, the view being in section for the head portion for one of the cylinders, and in top plan for the head portion for the other cylinder, showing one of the rocker arms and the eccentric supporting shaft therefor, and fuel injection valve.

Fig. 7 is a vertical sectional view through the head taken on the line 7—7 of Fig. 1.

Fig. 8 is a side elevational view, and Fig. 9 is an end elevational view of a camming annulus for one of the cylinders, six of which, one for each cylinder, are carried on the cam shaft for the engine.

Figs. 10 and 11 are end and side elevational views, respectively, of a cam element, shown in enlarged view, applicable to the annulus of Figs. 8 and 9.

Figs. 12 and 13 are end and side elevational views, respectively, of a supporting annulus for the camming annulus of Figs. 8 and 9.

Fig. 14 is a section showing a view at right angles to the view of Fig. 1, of the manually operated means employed to control the adjustment of the fuel injection valve operating mechanisms.

Figs. 16 and 17 are end and side elevational views, respectively, of the eccentric supporting shaft for the rocker arms.

Figs. 18 and 19 are side and end elevational views respectively of the rocker arm adjusting screw.

Figs. 20 and 21 are side and plan views respectively of a rocker arm.

Figure 1:
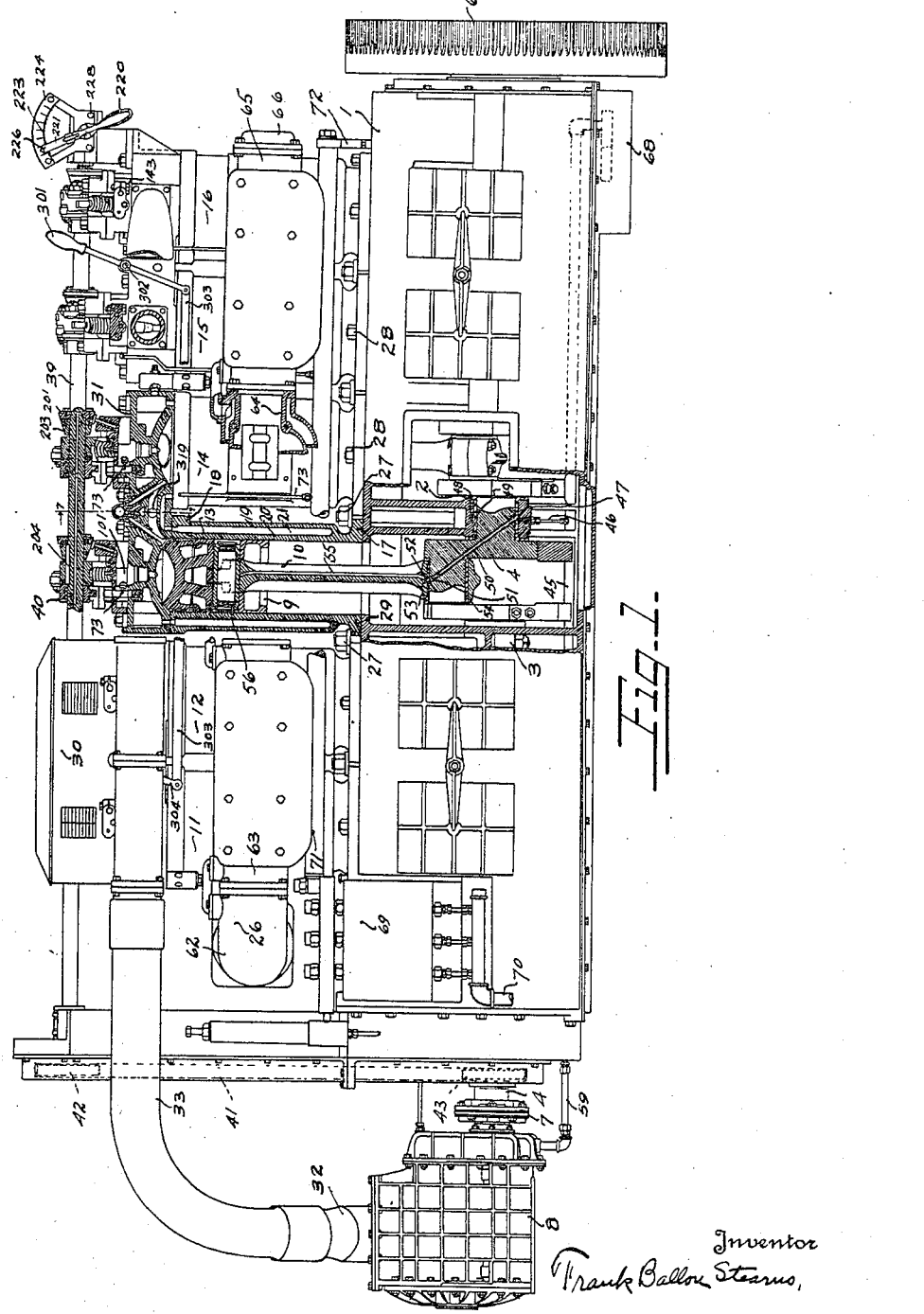
Fig. 1 illustrates partially in side elevational view and partially in longitudinal medial sectional view, a six-cylinder two-cycle engine of the Diesel type, embodying the principles of my invention.
Figure 2:
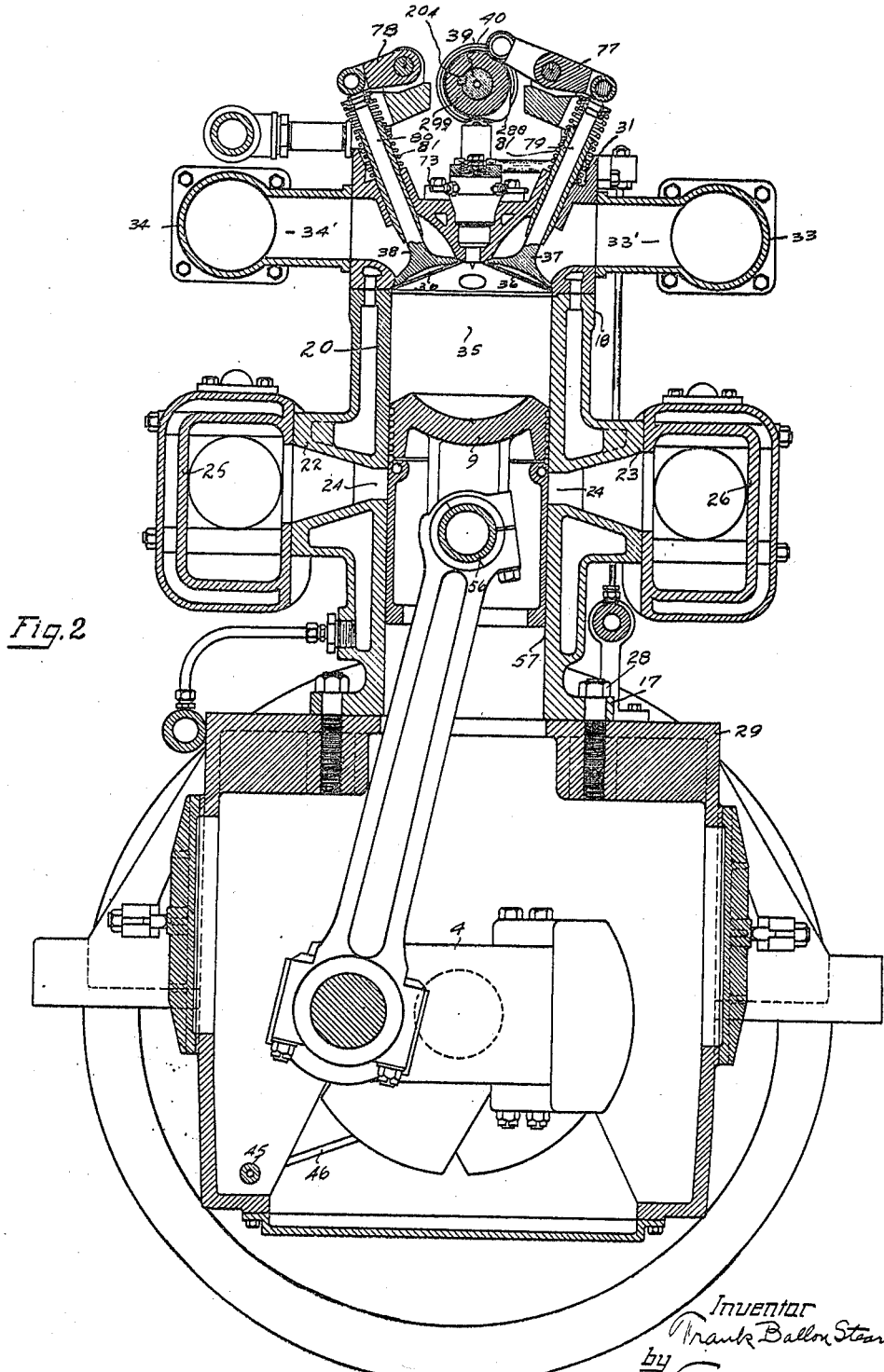
Fig. 2 is a transverse sectional view of the engine taken through the longitudinal middle of one of the engine cylinders, with certain parts being shown in elevation.

Referring now to all of the figures of drawings in which like parts are designated by like reference characters, at 1 I show the crank case for a 6-cylinder internal combustion engine, in which there is journalled at 2, 3 and elsewhere a rotatable crank shaft 4, which carries a fly-wheel at 6, and by a flexible coupling 7, drives the rotor of air pump 8, and which by its intermediate cranks as later described, joins with connecting rods of the six like reciprocable pistons, one of which is shown at 9 and its connecting rod at 10, the pistons are adapted to reciprocate in the cylinder blocks 11, 12, 13, 14, 15, and 16, which are disposed in parallel and in line.

Each of the cylinder blocks comprises a flanged base 17 and flanged top 18, and water jacketed intermediate portion comprising an outer shell 19 and an inner cylinder 20, the cylinder and shell being spaced to provide a channel 21 for conducting cooling water pumped therethrough continuously during operation of the engine in the usual manner for automotive engines.

Figure 4:
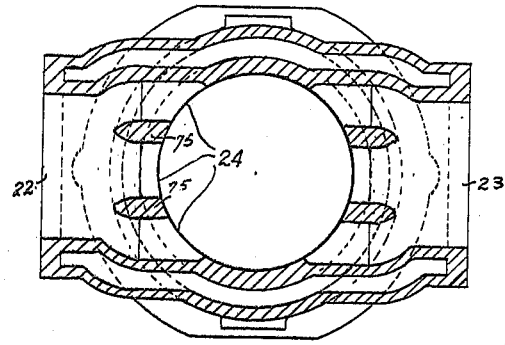
Fig. 4 is a horizontal transverse view taken through one of the engine cylinders.
Figure 5:
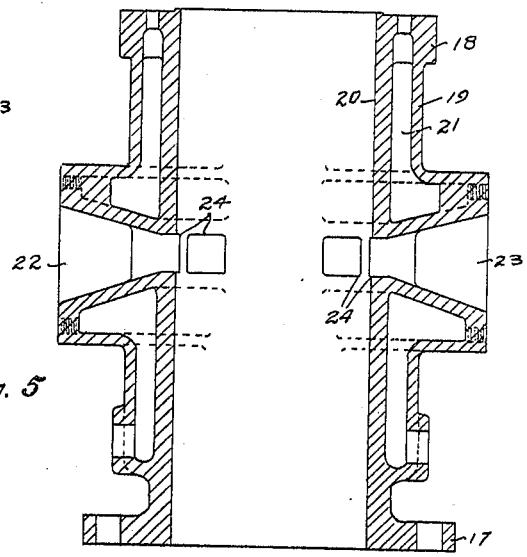
Fig. 5 is a sectional view taken through the longitudinal middle of one of the engine cylinders.

The block comprises also, at either side, as better shown in Figs. 4 and 5, like laterally extending projecting portions 22 and 23, which lead from cylinder exhaust ports 24 to the water jacketed like exhaust manifolds 25 and 26. The cylinder block bases 17 are each bolted by bolts 27 and 28 to the flanged top 29 of the crank case, the bolts 27, however, performing the additional function of re-enforcing the support for the crank shaft bearing 2.

Each successive pair of cylinders is provided with a common cylinder head, there being, therefore, three cylinder heads for the six cylinders. The heads are specifically illustrated particularly in Figs. 2, 3, 6, and 7, and generally and aggregatively illustrated in Fig. 1.

A cover 30 for one of the twin heads is shown in Fig. 1. One of such heads is shown in longitudinal medial vertical section at 31, Fig. 1, and in transverse vertical section in Fig. 2, and partly in longitudinal horizontal section in Fig. 6.

Leading from the pump 8 is a supply conduit 32 branched to provide a pair of air conduits 33 and 34 extending longitudinally on each side of the engine adjacent the cylinder heads 31 and which are effective to introduce air by branches 33' and 34', respectively, to the different engine cylinder combustion chambers 35 through a pair of valve ports 36 provided in the head for each cylinder and which are adapted to be opened and closed as hereinafter more specifically described by the operation of valves 37 and 38, respectively.

The opening and closing movements of the valves is controlled by a cam shaft 39, said cam shaft being journalled at its ends and at intervals intermediate its ends, as at 40, for rotational movement, imparted to it by a chain 41 which embracingly engages a toothed sprocket gear 42 which is rigidly secured near an end of the cam shaft. The chain 41 also embraces a driving sprocket gear 43 which is rigidly keyed on to the engine crank shaft 4.

An oil pump is preferably disposed in the crank case sump 68, and is driven by the crank shaft through suitable gearing, not shown in the drawings, in the ordinary way. The oil pump supplies oil under pressure to the various crank shaft and other bearings by oil ducts, such as 45, leading from the oil pump, which is branched as at 46 to introduce oil through passages 47 to an annular groove 48 encircling the crank shaft bearings 2, from which by openings 49 oil is communicated to the bore 50 extending obliquely of the crank shaft 4 to communicate through opposing grooves 51 and 52, and openings 53 associated with the bearing 54 for the connecting rod 10, of each particular cylinder.

The connecting rod 10 is provided with a lubricating oil duct 55 leading to the wrist pin 56 which is secured within the piston 9 to lubricate the bearing surfaces of the connecting rod and wrist pin and also the walls 57 of the engine cylinder 20. Also leading from the oil pump 44 are other lubricating oil supplying conduits, such as that illustrated at 58, which by nipples 58' provides lubricating oil for the cam shaft bearings 40, via the bore 156 of the bored cam shaft 39. Other oil supplying conduits, such as 59, supply oil to the air pump 8 from the discharge side of the oil pump 44, and to other bearing surfaces.

At each side of the engine extending longitudinally of the engine, are provided a pair of exhaust manifolds 25 and 26 which are water jacketed by enclosing shells. As previously stated, like laterally extending projecting ducts 22 and 23 are comprised in the cylinder block to lead exhaust gases from the cylinder exhaust ports 24 to the twin exhaust manifolds 25 and 26. The exhaust manifolds 25 and 26 comprise a plurality of sections, the exhaust manifold 26, for instance, comprising sections 63, 64 and 65, one for each pair of cylinders, the end of the section 65 being closed by a closure plate 66, and the open end of the section 63 joining with the exhaust pipe 62, both of which for the two exhaust manifolds are joined together leading into a common exhaust pipe of relatively large cross-sectional area, whereby the exhaust gases may be discharged to atmosphere with minimum resistance.

Both the intake manifolds 33 and 34 and exhaust manifolds 25 and 26 comprise relatively large smooth passages for gaseous fluid flow so as to introduce a minimum resistance to fluid flow by the walls of the manifolds.

The exhaust ports for each of the cylinders are illustrated best in Figs. 4 and 5, Fig. 4 being a horizontal transverse view, and Fig. 5 of which shows a vertical medial sectional view. Each cylinder comprises at opposite sides, three ports 24 separated by longitudinally extending webs 75, which extend for a short distance into the laterally extending exhaust ducts 22 and 23 and are of stream line form tapering toward their outer ends to restrain formation of eddies in the bodies of gases exhausting through the ports.

It will be noted, by reference particularly to Fig. 4, that the exhaust ports when uncovered by the downward movement of the piston 9, supply very free communication between the cylinder and the exhaust ducts, and that fully one-half of the space around the cylinder is opened by the provision of the ports, and the form of the exhaust ducts 23 is preferably so made as to effect expansion of the gases as they pass therefrom.

Air compressed in the pump 8, and discharged therefrom at 32, is projected laterally of the engine cylinder heads in a pair of wide parallel pipes 33 and 34, comprising the jointed sections and is communicated to the different engine cylinders through their individual valve ports 36, for each cylinder, when their cooperating companion valves 37 and 38 are opened.

Figure 3:
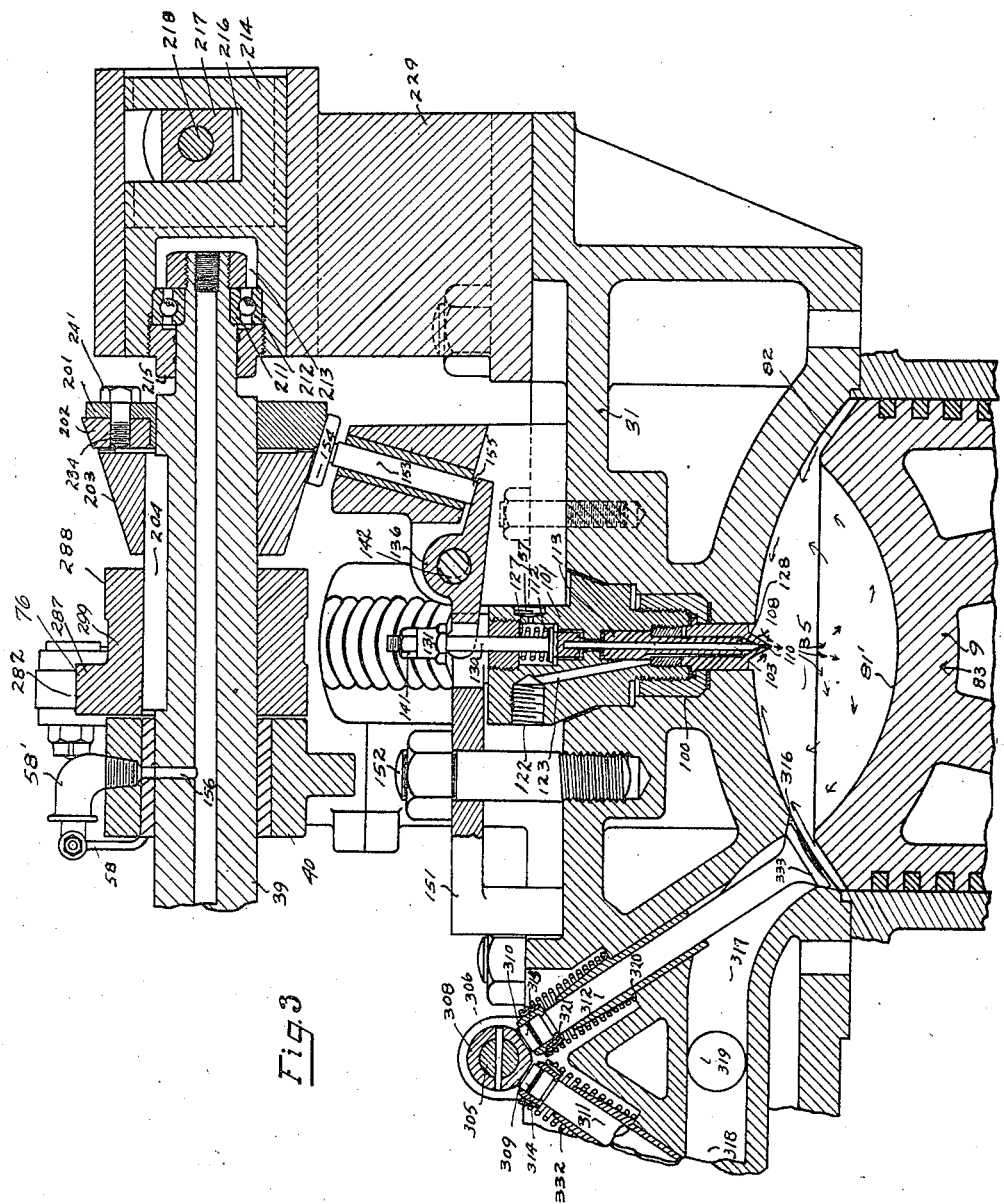
Fig. 3 is a longitudinal medial sectional view of the fuel injection nozzle and operating mechanism therefor provided for each one of the like cylinders, and a fragment of the cylinder and piston shown in certain relative positions.

A fuel oil pump 69, which is also driven from the engine crank shaft, supplies fuel oil under the desired pressure, which may range from 3000# per square inch to any other desired pressure, in some cases very greatly in excess of 3000# per square inch, the fuel oil being admitted through an inlet pipe 70 and discharged therefrom to different cylinders via a discharge conduit 71 which is supported at intervals by supports 72 under a side of the engine and from which branching ducts 73 extend upwardly, each to an inlet 122, Fig. 3, of a fuel injection valve mechanism 101, having the reciprocating needle valve 103 adapted to be seated to close a miniature nozzle passage 110 projected through the conical tip of the nozzle element 108 and which conical tip projects slightly into the combustion chamber 35 of the engine cylinder.

One of the said injection valve mechanisms 101 is rigidly secured to the head 31 of each cylinder, axially thereof, by being forced into a properly shaped recess 100 of the head and held in place by clamps 151 held in place by bolts 152, which are screw threaded into the engine cylinder head, as best shown in Fig. 3.

Intercommunicating passages 123 lead from the injection valve inlet opening 122 to the space 128 on the approach side of the valve passage 110. The valve 103 is suitably bushed by a bushing 113 for a considerable portion of its length and is reciprocated by virtue of the axial reciprocation of the stem 130 by the rock arm lever 136, which is rocked to lift the valve by the downward movement of a valve rod 153, the valve rod being provided with an operating head 154 at its upper end and contacting by its lower end 155 with an end of the rocker arm 136, whose other end engages the under side of a locked nut 131 screw threaded onto the end of the valve stem 130.

The usual packing nut is not provided in this construction, to prevent substantial leakage of fuel oil along the needle valve, reliance being placed upon the slender dimension of the valve and the snug sliding fit of the valve in the bushing 113. The discharge passage 137 leading from the space 127 discharges whatever fuel oil seeps along the needle valve and between the needle valve and the bushing 113 as it collects. The advantage is that varying frictional effects are avoided and the needle may move at all times freely in the bushing.

The nut 131 is locked in a given adjusted position by a lock nut 141. The purpose of making the needle valve 103 so slender is to obviate the pressure of fuel oil on it and making it unnecessary to have an unduly stiff spring to close it against pressure.

A rotary cam mechanism for each fuel injection valve, comprising a camming annulus 201, being telescoped over the cam shaft 39 is supported by a conical collar 203 which is nonrotatably secured to the cam shaft 39 by a key 204.

A hardened cam insert 202 has a threaded aperture 234 for engagement by the screw 241 passed through an aligned aperture of the annulus 201, as indicated best in Figs. 3 and 8. The cam 202 is best illustrated in Figs. 10 and 11, and comprises a block preferably of hardened steel, having an arcuate inner edge with straight sides 242 and 243, and an operating cam face comprising portions 235, 236, ad 237.

The cam 202 is snugly received in a recess of the annulus. The cam is divided into camming portions 235 and 236, and an intermediate portion 237. The surfaces 235 and 236 are inclined longitudinally in the direction of the conical exterior of the annulus 201 and collar 203, converging longitudinally of the crank shaft.

The cam surfaces 235 and 236 are also in lateral directions, curved arcuately from the joining portion 237, the radii for the surfaces 235 and 236 intersecting at a point intermediate the cam surfaces and the centers from which surfaces are determined. The radii is of considerable length, such as 9¾ inches, for the surfaces 235 and 236, whereas the relatively small intermediate joining surface is formed on a relatively small radii, being a fractional part of an inch.

Fig. 11 shows portions of certain of these radii 238, 239, and 240, for portions of the surfaces 235, 237, and 236 respectively.

Alternately disposed on the cam shaft 39 with the injection valve operating camming annuluses 201 are a plurality of air inlet operating cams 299, each of which is provided with a pair of longitudinally spaced cam surfaces 287 and 288 which are made of sufficient width, measured longitudinally of the shaft 39, that the relatively short adjusting longitudinal movements of the shaft 39 effecting variations in the fuel injection, as previously described, may be accomplished without disturbing the nature of the contacting engagement between the rocker arm rollers 282 and the cam surface.

A pair of projections 76 are provided, each radially displaced and longitudinally spaced on the cam 299 so that both of the rollers 282 and 283 will be simultaneously lifted by their respective cam projections 76 and simultaneously retracted to restore the valves.

In other words all portions of the camming surfaces 287 and 288, extend longitudinally in directions parallel to the axis of the cam shaft 39 and by virtue thereof the shaft carrying the cam 286 may be shifted longitudinally without varying of the degree or period of actuation of the air inlet valves 297 and 298.

The cam shaft 39 is adapted not only to rotate in its bearings 40, but may be adjustably reciprocated axially, carrying with it the rotary cams comprising the air inlet valve cams, and the fuel injection valve cams 201. Axial reciprocation of the cam shaft effected by the manually adjustable apparatus shown in the upper right hand corner of the drawing of Fig. 1, affects the degree of lifting movement imparted to the needle valve 103 through the instrumentality of the valve tappet 153.

Each of the annuluses 201, Figs. 8 and 9, are provided with a pair of concentric arcuate slots 205 and 206 into which a pair of bolts may be projected to enter either pair of threaded holes 207 or 208, of the collar, and before the bolts are secured home bringing the toothed face 209 of the annulus into engagement with the teeth 210 on the larger end face of the collar, the two parts being rotated to the desired relative angular positions and then when the bolts are screwed home, the interengagement of teeth of the annulus and collar prevent relative angular displacement of the collar and annulus. This arrangement provides an adjustment to determine the point in the rotative travel of the cam shaft 39 which rotates in unison with the engine crank shaft 4, whereat the cam 202 engages the head 154 of the valve tappet 153 to lift the needle valve 103 by rocking the rocker arm 136.

Whenever the cam shaft with the alternately disposed air inlet, and fuel injection rotary cams is moved axially in a direction toward the left, at each engagement of the cam 202 carried by the annulus, the valve will be lifted at an earlier point during the rotation of the cam shaft and will be held open longer than when disposed in an adjusted position axially disposed more towards the right, as viewed in Fig. 1.

All valve operating cams, two for each cylinder, are alike simultaneously moved longitudinally with the shaft, and the generally conical camming face engageable with the head of a like valve operating rod, which is preferably set at an angle of 90° from the engaged inclined surface portion of the conical cam. Upon rotation of the shaft 39, each of the valve tappets receive like timed periodic valve-opening impulses to vary, alike, the period during which its associated injection valve is operated to discharge liquid fuel under high pressure into the engine cylinder.

The axial adjustment of the cam shaft is effected, preferably, in the following manner. The end of the cam shaft carries a ball bearing mechanism 211, which, by an outer race member 212, is rigidly secured within an end recess 213 of a longitudinally slidable non-rotatable block 214 by a clamping collar 215 screw threaded in the block against the race member 212. The outer portion of the block is transversely slotted at 216 to admit a rectangular slide piece 217 which is adapted to reciprocate in the slot 216 in vertical directions.

A manually rotatable crank shaft 219, rotatable by manipulation of a handle 220, causes movement of an eccentric extension 218 of the shaft 219 and projecting longitudinally therefrom into and through the slide piece 217.

The slide piece is therefore carried with the eccentric extension element 218 eccentrically of the crank shaft 219 when it is angularly rotated by its handle, accomplishing lateral translation of the slide piece 217 while it is moved vertically, or rather while it is moved arcuately about the axis of the shaft 219, and the lateral component of movement of the slide piece 217 will effect movements in corresponding longitudinal directions of the block 214 and effect a bodily longitudinal translatory movement of the cam shaft depending on the rotative adjustment again imparted by the rotation of the handle 220 affixed to the shaft 219.

The shaft 219 is locked in a given adjusted rotative position upon release of the handle 220, by virtue of the provision of a pawl 221 continually pressed by a spring 222 into indenting locking position with teeth or serrations 223 of an arcuate strip 224 carried on a support 225, which is bolted at 228 to the support 229 carried by the engine head, and which also supports the crank shaft 219 and associated mechanism comprising the bearing 212 and block 214.

The elongated front plate is pointed at its upper end 230 and the arcuate plate 224 is inscribed, as shown in Fig. 1, with scale divisions whereby the pointer plate 226, indexing with a given scale division on the arcuate plate 224, indicates the axially adjusted position of the crank shaft 39 and the condition as to duration of fuel injection for the different engine cylinders. A linkage comprising a supplementary hand grip 231, rod 232 and crank lever 224 effects, by the free end of the lever 224, an unlocking downward movement of the pawl 221 when the handle 220 and grip 231 is gripped by the operator preparatory to making the angular adjustment of the shaft 219 and upon release of the hand grip, the spring 222 restores the pawl to locking position with the teeth 223 of the lower arcuate edge of the plate 224.

Preferably two adjustments, individual to each of the engine cylinders, is provided for varying the amount of lift imparted to the needle valve 103 by the reciprocating movement of the valve operating rod 153. First the nut 131 on the threaded end of the valve stem 30 is adjustable longitudinally of the valve stem, and its lower surface therefore may be raised or lowered for earlier or later engagement with the free end 135 of the rocker arm 136 and locked in its adjusted position by turning the locking nut 141 tightly down on to it.

Also, the angular position of the rocker arm 136 relative to its supporting shaft 142 may be adjustably varied by rotating the adjustment screw 143 which is provided with external threads 144 in threaded engagement with longitudinally extending teeth 142' provided on the exterior surface of the shaft 142. The form of the shaft 142 and the relative position of the rocker arm 136 when disposed thereon, is best shown in Figs. 6 and 17, which show the rocker arm 136 mounted on an eccentrically disposed portion 147 of the shaft 142, and whereby when the relative angularity of the parts 136 and 147 is changed, the rocker shaft 142 will rotate in its bearings and the eccentric portion 147 will be moved in an upward or downward direction, to vary the period of lifting effort imparted to the needle valve 103.

This adjustment is one which may be varied in order to equalize the work done by all of the cylinders which may be determined in any manner as by noting the temperature existing in the different cylinders and bringing them to a common operating temperature. The eccentricity of the shaft 142 is very slight, being of the order of about .030 inch.

Other portions of the engine and auxiliary equipment are generally of well known types and will not require specific description.

For each cylinder a compression relief valve 333 is provided having a stem 312 projecting upwardly through the cylinder head, a pair of such valve stems 311 and 312 for adjacent cylinders being best illustrated in Fig. 3, as converging toward their upper ends and terminating in cam face engaging heads 314 and 315, adapted to simultaneously engage the flattened surface portions 309 and 310 respectively of a common rotary cam 308 provided for the adjacent pair of cylinders. Each of the valves 333 is pressed to seat in its valve port such as 316 in the head of its respective cylinder by compression springs 322, which are disposed between an end wall 329 in a recess of the cylinder head 31 and with a flanged collar 321 carried on the head of the valve stem.

When the cam 308 is rotated by the shaft 305, the heads 314 and 315 for the valve stems 311 and 312 respectively, will be caused to engage the non-flattened surfaces of the cam disposed more distant radially from the axis of the shaft to effect downward pressure on the valve stems against the pressure of the valve springs to slightly open the valves 333, pressing them downward from their seats.

Gases under pressure in the cylinder chamber 35, will be partially relieved by means of the tandem ducts 317 and 318 for the associated pair of cylinders, discharging through an exhaust port 319. To operate all of the compression relief valves, simultaneously, means are provided for simultaneously rocking the cam supporting shafts 305 for each adjacent pair of cylinders, comprising a manually operated lever pivoted at 302, and adapted to reciprocate a rod 303 which extends longitudinally of the engine adjacent the cylinder heads.

To communicate motion from the rod 303 to the cam shafts 305, cam shaft levers 304 are provided, one being keyed to each cam shaft and its free end being pivotally connected to the operating rod 303.

Therefore, reciprocation of the handle 301 on its pivots 302 will reciprocate the rod 303 to effect an angular rotational movement to the different cam shafts 305 through their respective operating levers 304, to unseat all of the valves 333 a predetermined corresponding amount, according to the movement of the handle 301.

It will be noted that, for instance, by rotating the flattened cam face 310 to a position of engagement with the head 314 for the alternate valve stem 311, the movement of the handle 301 to effect this will effect a compression relief, of alternate cylinders only.

I preferably, as hereinafter more fully related, time the engine cylinders to fire in the order of their placement, and relative to the direction of flow of the exhaust gases through the tandem exhaust pipes which extend along the two sides of the aligned cylinders.

In the starting of an engine having a plurality of aligned cylinders fired sequentially, the relief of compression in alternately disposed cylinders is productive of a more nearly uniform torque upon the starting mechanism than an arrangement wherein compression were released in nonsequentially disposed cylinders, of equal number, comprising half of the total number of cylinders.

The compression relieving mechanism disclosed herein, including the common cam 308 disposed between pairs of cylinders, lends itself in a structurally economical manner to the very advantageous method of starting wherein with substantial uniform reduced starting torque, one-half of the cylinders relatively symmetrically disposed are in most efficient condition for firing.

Figure 15:
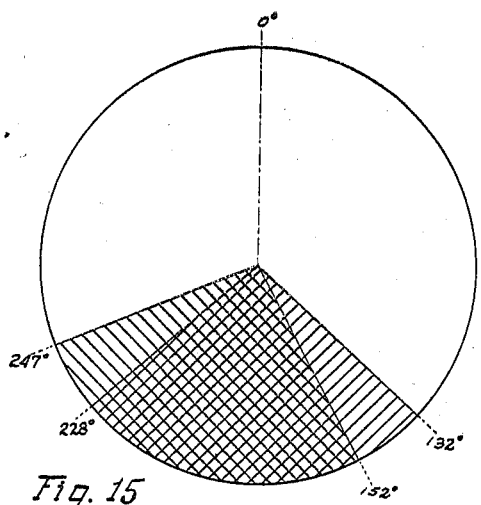
Fig. 15 is a chart illustrating diagrammatically certain of the principles of operation of my invention.
Figure 23:
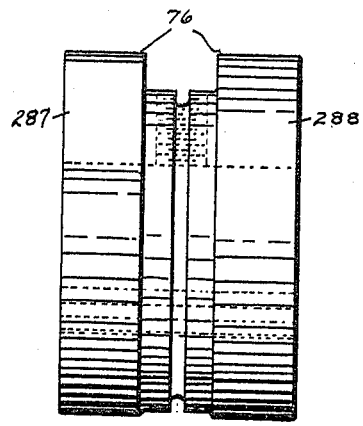
Figs. 22 and 23 are end and side elevational views, respectively, of an air inlet valve cam.
Figure 22:
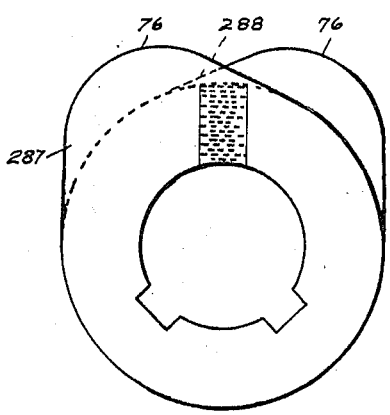

In the operation of the engine, a mixture of air and fuel oil is burned in the engine cylinder effecting expansion of the burning gases and forcing the piston downward. At a point wherein the engine crank shaft has rotated through an angle of 132° Fig. 15, from the position it assumes when the piston is in top dead center position, the exhaust ports 24 are uncovered by the continued downward movement of the piston, and burned gases start in a bodily movement to discharge through exhaust ports.

The pressure of the burned gases at the moment the exhaust port starts to open, may have decreased from a pressure of perhaps 800# per square inch, maximum pressure, down to about 40 to 60# pressure, and later at about 152° crank angle position, the air inlet valves 36 start to open. This is accomplished for each cylinder by a rotary cam 76 which is keyed at intervals on the cam shaft 39, it being disposed above each engine cylinder head through the twin rocker arms 77 and 78 which are practically simultaneously engaged by the cam to simultaneously depress the valve stems 79 and 80, respectively, against the retractive power of the pair of springs 81, one for each valve, which restore the valves 37 and 38 after they are unseated by the downward movement of their respective stems.

At the moment the inlet valves start to open at 152° crank angle position, the pressure in the cylinder is decreased very materially and the decrease of pressure in the cylinder continues until at approximately 160° crank angle position, in the embodiment of my invention illustrated, the fluid pressure in the engine cylinder has reached a pressure which is substantially below atmospheric pressure. This notwithstanding that some air has already been admitted into the cylinder by the opening of the valve ports 36 in the head.

I have discovered that in an engine as herein illustrated and described, such a low pressure, and preferably a sub-atmospheric pressure, may be reliably obtained when the engine is operated as described and I utilize this knowledge in a very useful way.

The pressure of air in the air inlet manifolds 33 may be, say, of 3# to 6# pressure. This would cause air to flow into the engine cylinder when the ports 36 are opened, at a predetermined rate and for a given period of opening the predetermined amount of air would pass into the engine cylinder against any lower pressure in the engine cylinder.

Ordinarily, however, the pressure existing in engine cylinders when air is being introduced thereto is so high that this pressure must be overcome by an increase in pressure in the air inlet conduits. Consequently a great deal of power must be expended in compressing air to such a higher pressure. On the contrary, I preferably employ a relatively low pressure of inlet air from a source which may then be economically operated and increase the rate of flow by admitting the air through specially large inlet valve openings, and by previously reducing the pressure in the cylinder at a predetermined point in the engine cycle, during the first part of the air admission period.

The reduction of pressure, preferably, effects a pressure in the cylinder below that of the atmosphere, and this condition is realized, moreover, in a manner involving the anomaly of continuing the pressure decrease to that of, say, 3# below atmospheric pressure, in a given engine, after the inlet valves have actually been opened. Of course this would be impossible if air at a relatively high pressure were forced into the engine cylinder, in the usual way, in order to overcome the usual substantial pressure of the existing gases in the engine cylinder at the time the inlet valves start to open.

However, the air admitted through the large valve ports is only impelled to enter the cylinders by a relatively low pump pressure and the air, therefore, moves into the cylinder, bodily, at a velocity which is not too high to avoid a consequent immediate increase in pressure in the cylinder, with the result that as aforesaid, at the expiration of 8° crank angle travel of the piston, during all of which time the inlet valves are opening, the pressure in the cylinder is actually less than at the moment the valves start to open. This is effected, moreover and essentially, as a result of the momentum or inertia of the exhaust gases passing into the exhaust manifolds, rapidly and bodily, creating what is popularly termed a "vacuum" at the rear of the rapidly moving exhaust gases, that is in the engine cylinder.

This effect is contributed to by the movement of the piston, meanwhile, in a downward direction, towards its lowermost position. However, at the lowermost position of the piston, the inlet air has begun to fill the engine cylinder pushing ahead of it such remnants of the exhaust gases as may be still contained therein, with, of course, a mixture of exhaust gases with the admitted air, and these remnants of exhaust gases are, therefore, expelled during what is termed the "scavenging" operation of the air admission period, and which continues from preferably 152° crank angle position to preferably about 228° crank angle position when the exhaust ports are again reclosed.

The inlet valves are closed later at about 247° crank angle position on the continuing upward stroke of the piston, the portion of the air admission period after scavenging being the supercharging period wherein air continues to flow into the cylinder before the inlet valves close, up to the ability of the air pump to force air into the cylinder under the conditions of greatly increasing pressure in the cylinder resulting from the filling of the cylinder with air and the simultaneous upward movement of the piston.

The inlet valves being reclosed, the piston continues to move upwardly compressing the air all the way up to top dead center position, and by well known principles previously utilized in the well known types of Diesel engines, the temperature of the air is increased by the adiabatic heat of compression until at some point, preferably prior to the top dead center position of the piston, fuel oil is injected suddenly and violently through the atomizing passages 110 in the fuel injection nozzle 107, which is effected by the rotary movement of the cam 202 carried by the annulus 201 on the cam shaft 39, as previously described.

The fuel oil is injected under very high pressure, which may be, for instance, from 3,000# to 20,000# per square inch, and is received into the head of the engine cylinder in a highly atomized condition.

Referring now particularly to Figs. 1 and 3, in Fig. 3 arrows are shown in the combustion chamber 35 in an attempt to indicate graphically some of the phenomena attending the movement of the compressed air contained in the combustion chamber at the moment of the injection of fuel oil, which is indicated as being projected radially from the end of the nozzle 108.

The head of the piston is preferably formed as shown with a concave centrally disposed parti-spherical surface 81' and a bordering outer convex surface of annular parti-spherical form, indicated at 82. The piston 9 is shown in Fig. 3 as nearly in top center position, which it is approaching, as indicated by the arrow 83, and air is indicated by arrows as being squeezed between the opposing parti-spherically annular surfaces 82 of the piston and 83 of the cylinder head.

A current of air in the form of a sheet is therefore caused to flow at a high velocity toward the nozzle in the center of the head, under the upper walls of the cylinder, the flows from all directions meeting at the nozzle are intermingled thereat and with the injected fuel oil which is projected divergingly from the end of the nozzle, while both inlet and exhaust valves are closed.

"Turbulence", so-called, is thereby produced and the combustion chamber at the moment of firing following injection is of an approximately ideal form comprising upper and lower parti-spherical bounding walls of the cylinder head and piston head, respectively.

Firing is accomplished effecting burning of the compressed air and the tremendous power resulting from the increased pressure of the burning gases is communicated to the head of the piston, forcing the piston in a downward direction after which the cycle of operations just described is repeated.

The movement of gases to and from each of the cylinders is accomplished always in a downward direction avoiding undue intermingling of the fresh charge of air with the burned gases and avoiding inefficiencies due to the necessity of stopping the movement of air in one direction and reversing its movement. In order to carry the beneficial effects resulting from the exercise of this principle still further, the engine cylinders are all preferably fired in order to their placement, that is in the following order: 1—2—3—4—5—6, and the exhaust manifold is so placed relative to the different cylinders that the gases exhausted starting with the cylinder at the beginning of the manifolds and then successively expelling the gas from the other cylinders in order proceeding toward the back end of the manifold, which is joined to the exhaust pipe leading from the engine and which is joined to the exhaust manifold pair of sections 62, Fig. 1.

The movement of gases in the cylinder is always in the same direction from the one end to the other and intermittently firing the charge of mixed fuel and air from one end of the cylinder, subsequently so suddenly exhausting the resultant gases from the other end of the cylinder toward which the piston moves during firing, that the kinetic energy resulting from the passage of the gases from the cylinder in a bodily movement thereof effects a condition of sub-atmospheric pressure in the cylinder at a predetermined point in the piston travel and then admitting air to the firing end of the cylinder at just the proper time to realize the combined push-pull efforts of the inlet air pressure and sub-atmospheric pressure ahead of the incoming air.

The effect of the co-incidental "puffing" of new air into the inlet end of the cylinder, as above described, with the suction draft of approximately the same, but oppositely directed fluid pressure at the other end of the cylinder is to effect a simultaneous push and pull to the body of gas in the cylinder from the two ends thereof, continuously over a substantial period and during which the movement of air into the cylinder is not greater than the movement of gases by volume, out of the cylinder.

This action results very largely in a condition of "stratification" long sought in internal combustion engine operation, but never before realized to such a satisfactory degree as in the engine of my present invention.

That is, as the clear air advances into the cylinder from the inlet end, it passes downwardly but without a great deal of mixing when the burned gases being exhausted, there being a continuous movement at substantially the same rate of all portions of the body of air and gas, air at the top and gas at the bottom. Of course, I appreciate that this is not always precisely true, there being some mix-up, but in principle and so far as practical results are concerned, it is very generally true and accomplishes the recharging of the cylinder with practically clean air during part of the same period when the exhaust gases are still moving from the cylinder and without undue mixing of the two contacting fluid bodies.

The recharging of the internal combustion engine cylinder after a firing period, is thereby accomplished by virtue of the eduction of the burned gases, at rates within a given range of rates, while new air is simultaneously introduced, at rates coming practically within the same range of rates, at the other end of the cylinder.

In the above operation a very great economy of air is effected. In prior engine constructions with which I am familiar, a great deal of the power of the engine is expended in compressing the air, and that is particularly true of engines operated at relatively high speed. The engine of the present embodiment has been operated at speeds well above 1000 R. P. M., the embodiment engine having an 8-inch stroke and a bore of 6 inches, giving a 225 cubic inch displacement. It was found that in the exhaust manifold during the running period, the average fluid pressure obtaining in the exhaust pipe was about ⅛ pound. Double expansion chambers are preferably used on both sides of the six-cylinder engine, each of 12½ square inches in cross section and 20 inches in length, making a volumetric capacity of 450 cubic inches which is twice the volume of the cylinder displacement.

The exhaust ports in the above engine were 12½ square inches in area permitting the exhaust gases to get away from the cylinder very rapidly. The above cycle of operation permits a great deal of air to be stored in the cylinder before compression of the air is started, and therefore more fuel may be burned in the air and more power secured. The amount of air supplied to the engine of the above embodiment preferably varies, being approximately from 14% to 27% more air than the engine actually displaces. A small part of this air goes out of the exhaust and the balance in charge and supercharge. The engine constructed as above stated, is a six-cylinder engine and is capable of producing 225 horse-power at 1000 revolutions per minute.

The air pump is preferably so made that at all intermediate and usual working speeds of the engine, ranging from 250 to 1,000 revolutions per minute, the amount of air supplied to the engine is proportional to the speed thereof, and for an embodiment of my invention constructed as described, I preferably supply from the pump, an amount of air which, at atmospheric pressure, would occupy one cubic foot of space for each revolution of the engine crank shaft, that is at 500 R. P. M., a total of 500 cubic feet of air, figured at atmospheric pressure, is supplied to the six cylinders, and at 1,000 R. P. M., 1,000 cubic feet is supplied to the cylinders, being preferably about 27% more than the amount of air displaced by the cylinder.

Also, the pressure of air, above atmosphere, supplied from the pump, will be increased particularly proportional to the speed, as also is the sub-atmospheric pressure existing at an operation of the stroke of the engine increased proportional to the speed of the engine, so that the conditions effecting introduction of air to the cylinder at all speeds, are practically the same.

The area of each of the intake valves is made purposely large, about 2 1/16 inches in diameter, in order to effect admission of air with minimum resistance.

Having thus described my invention in a specific embodiment, I am aware that numerous and extensive departures may be made from the embodiment herein illustrated and described but without departing from the spirit of my invention.

I claim:

1. In a multi-cylinder internal combustion engine, a plurality of cylinders disposed in a line and having pistons reciprocating therein, a pair of air supply conduits extending along opposite sides of the cylinder line, a pair of air intake ports opening into each cylinder at an end thereof, a pair of air intake passageways for each cylinder each extending from a different one of the air supply conduits to a different one of the pair of ports, an air supply pump communicating with both conduits and driven by the engine, a pair of exhaust conduits extending along opposite sides of the line of cylinders, a plurality of exhaust ports in each cylinder disposed to be covered and uncovered by reciprocation of the piston, a pair of exhaust passageways from each cylinder, each extending from a different one of the exhaust conduits to different ones of the exhaust ports, a piston at the end of a power stroke uncovering the exhaust ports of its cylinder, valves operated by the engine to simultaneously open the intake ports of the cylinder and to simultaneously close them after closure of the exhaust ports by return stroke of the piston, the valve ports being disposed symmetrically with respect to the cylinder axis and equally distant from the piston head whereby upon the exhaust of burnt gases through the exhaust ports, air under pressure may flow into the cylinder and scavenge the burnt gases substantially without turbulence, the exhaust passageways and exhaust conduits being formed to induce sub-atmospheric pressure in the cylinder by the kinetic energy of the exhaust.

2. The method of operating an internal combustion engine of the two cycle Diesel type comprising a piston reciprocable in a cylinder which includes abruptly exhausting the burnt gases from one end of the cylinder at the end of an explosion stroke of the piston, and causing the gases to rapidly progressively expand substantially to atmospheric pressure to cause the remaining gases in the cylinder to be substantially below atmospheric pressure, then, at a predetermined position of the piston, abruptly admitting at the other end of the cylinder, air maintained at pressure above atmospheric and proportional to the speed of reciprocation while continuing the exhausting from the first named end, then terminating the exhausting, the duration of admission being commensurable with duration of exhausting to effect a scavenging displacement of gases and a substitution of air therefor longitudinally of the cylinder with the minimum of turbulence.

3. The method of operating an internal combustion engine of the two cycle Diesel type comprising a plurality of pistons each reciprocating in a separate cylinder which includes, abruptly exhausting the burnt gases from one end of the several cylinders successively at the end of each explosion stroke of the pistons, and causing the gases to rapidly progressively expand substantially directly to atmospheric pressure each cylinder independently of the others, to cause the remaining gases in the cylinder to be substantially below atmospheric pressure, then, at a predetermined position of the piston, abruptly admitting at the other end of the cylinder, air maintained at pressure above atmospheric and proportional to the speed of reciprocation while continuing the exhausting from the first named end, then terminating the exhausting, the duration of admission being commensurable with duration of exhausting to effect a scavenging displacement of gases and a substitution of air therefor longitudinally of the cylinder with the minimum of turbulence.

4. In a multi-cylinder internal combustion engine, a plurality of cylinders having pistons reciprocating therein, air supply conduit means, an air supply pump driven by the engine for supplying the conduit means with air at superatmospheric pressure proportional to engine speed, a plurality of intake ports opening into the head of each cylinder from the air conduit means, an exhaust conduit means of relatively great volumetric capacity, a plurality of exhaust ports in each cylinder at the other end disposed to be covered and uncovered by the piston respectively during and at the end of the explosion stroke, a plurality of exhaust passageways each extending from different ones of the exhaust ports to the exhaust conduit means and formed to rapidly progressively effect expansion of exhaust gases flowing therethrough, to induce thereby subatmospheric pressure in the cylinder, valves operated by the engine to simultaneously open and simultaneously close the intake ports and timed to close the ports, after closure of the exhaust ports by movement of the piston on its compression stroke, whereby the joint action of subatmospheric exhaust pressure and superatmospheric intake pressure at opposite ends of the cylinder will cause a charge of air entering at the cylinder head to scavenge the burnt gases out of the cylinder at the other end to or beyond the exhaust ports.

5. The method of operating an internal combustion engine of the two cycle Diesel type comprising a piston reciprocable in a cylinder which includes abruptly exhausting the burnt gases from one end of the cylinder at the end of an explosion stroke of the piston, and causing the gases to rapidly progressively expand substantially to atmospheric pressure to cause the remaining gases in the cylinder to be substantially below atmospheric pressure, then, at a predetermined position of the piston, abruptly admitting at the other end of the cylinder, air maintained at pressure above atmospheric and commensurable with the speed of reciprocation while continuing the exhausting from the first named end, then terminating the exhausting, the duration of admission being commensurable with duration of exhausting to effect a scavenging displacement of gases and a substitution of air therefor longitudinally of the cylinder with the minimum of turbulence.

6. In an internal combustion engine, a cylinder having a piston reciprocable therein, an air supply conduit means, an air supply pump driven by the engine for supplying the conduit means with air at super-atmospheric pressure commensurable with the engine speed, an intake port opening into the head of the cylinder from the air conduit means, an exhaust conduit means of relatively great volumetric capacity, an exhaust port in the cylinder at the other end disposed to be covered and uncovered by the piston respectively during and at the end of the explosion stroke, an exhaust passageway extending from the exhaust port to the exhaust conduit means and formed to rapidly progressively effect expansion of exhaust gases flowing therethrough, to produce thereby sub-atmospheric pressure in the cylinder, a valve operated by the engine to open and close the intake port and timed to close the port, after closure of the exhaust port by movement of the piston on its compression stroke, whereby the joint action of subatmospheric exhaust pressure and super-atmospheric intake pressure at opposite ends of the cylinder will cause a charge of air entering at the cylinder head to scavenge the burnt gases out of the cylinder at the other end substantially to or beyond the exhaust ports.

7. In a multi-cylinder internal combustion engine, a plurality of cylinders having pistons reciprocating therein, air supply conduit means, an air supply pump driven by the engine for supplying the conduit means with air and super-atmospheric pressure commensurable with engine speed, a plurality of intake ports opening into the head of each cylinder from the air conduit means, an exhaust conduit means of relatively great volumetric capacity, a plurality of exhaust ports in each cylinder at the other end disposed to be covered and uncovered by the piston respectively during and at the end of the explosion stroke, a plurality of exhaust passageways extending from different ones of the exhaust ports to the exhaust conduit means and formed to rapidly progressively effect expansion of exhaust gases flowing therethrough, to induce thereby sub-atmospheric pressure in the cylinder, valves operated by the engine to simultaneously open and simultaneously close the intake ports and timed to close the ports, after closure of the exhaust ports by movement of the piston on its compression stroke, whereby the joint action of sub-atmospheric exhaust pressure and super-atmospheric intake pressure at opposite ends of the cylinder will cause a charge of air entering at the cylinder head to scavenge the burnt gases out of the cylinder at the other end substantially to or beyond the exhaust ports.

FRANK BALLOU STEARNS.